United States Patent [19]

Jáuregui Carro

[11] 4,332,682
[45] Jun. 1, 1982

[54] SYSTEM FOR COLLECTING PRODUCTS DUMPED ON THE SURFACE OF A MASS OF WATER

[76] Inventor: Francisco-Javier Jáuregui Carro, C/Castilla, 14-1° C, Santander, Spain

[21] Appl. No.: 176,244

[22] Filed: Aug. 7, 1980

[30] Foreign Application Priority Data

Aug. 13, 1979 [ES] Spain .................................. 483.346
Jul. 21, 1980 [ES] Spain .................................. 493.564

[51] Int. Cl.³ .......................................... E02B 15/04
[52] U.S. Cl. .................................. 210/242.1; 210/923
[58] Field of Search .............................. 210/242, 923

[56] References Cited

U.S. PATENT DOCUMENTS

| | | | |
|---|---|---|---|
| 2,497,177 | 2/1950 | McClintock et al. | 210/242.3 |
| 2,661,094 | 12/1953 | Stewart | 210/242.3 |
| 3,534,859 | 10/1970 | Amero et al. | 210/242.3 |
| 3,576,257 | 4/1971 | Yates | 210/242.3 |
| 3,612,280 | 10/1971 | Fitzgerald | 210/242.3 |
| 3,615,017 | 10/1971 | Valdespino | 210/242.3 |
| 3,642,140 | 2/1972 | Parker | 210/242.3 |
| 3,653,510 | 4/1972 | Fitzgerald | 210/242.3 |
| 3,706,382 | 12/1972 | Cross | 210/242.3 |
| 3,726,406 | 4/1973 | Dambeger | 210/242.3 |
| 3,730,346 | 5/1973 | Prewitt | 210/242.3 |
| 3,753,496 | 8/1973 | Boyd | 210/242.3 |
| 3,759,390 | 9/1973 | McCembie | 210/242.3 |

*Primary Examiner*—Theodore A. Granger
*Attorney, Agent, or Firm*—Wenderoth, Lind & Ponack

[57] ABSTRACT

A system for collecting products dumped on the surface of a mass of water includes cages to be arranged at the sides of a tanker. Each cage is preferably prismatic in shape. The height of the cages is such that when the tanker is at ballast, the lower parts of the cages will be submerged while the upper parts will be above the maximum loading line of the tanker. The cages are fastened to the sides of the tanker by freely rotating connection points. In the interiors of the cages is housed a series of floating suction pump inlet members or housings, likewise prismatic in shape, having appropriate dimensions to permit a great sensitivity to the least fluctuating movements of the liquid surface. The complete face of each suction pump inlet member, which is oriented in the direction of travel of the tanker, is provided with an opening which has a height such that the lower edge thereof will be positioned below the floating line of the suction pumps at an approximate depth of 0.01 meter.

22 Claims, 8 Drawing Figures

A-B

SYSTEM FOR COLLECTING PRODUCTS DUMPED ON THE SURFACE OF A MASS OF WATER

BACKGROUND AND SUMMARY OF THE INVENTION

The present invention relates to a system for collecting products dumped on the surface of a mass of water, and more specifically to a system for collecting petroleum products drifting on the sea due to discharge from submarine beds, collision of tankers, stranded tankers, or any other of the reasons and circumstances which give rise to the appearance of the dreaded "black tide".

Generally, the system of the invention involves positioning prismatic shaped cages at the sides of a tanker. The height of each one of these prismatic cages should be such that when the tanker is at ballast, the lower part of the cage will be submerged in the water, while the upper part will be above the maximum loading line of the tanker. The cages are secured to the beam-end of the tanker by attachment devices in the form of freely articulated connection points, so that the cages can be oriented in the most convenient direction with respect to the longitudinal axis of the tanker.

In the interior or each cage will be housed a series of floating suction pump inlet members or housings, also prismatic in shape, the dimensions of which should permit a high sensitivity to the least fluctuating movements of the liquid surface. In other words, if a floating pump inlet member has dimensions of 2 meters×0.4 meters×0.1 meter, then one of its faces having the measurements of 2 meters×0.1 meter should be oriented in the direction of travel of the tanker. The complete length of of this face is provided with an opening, the height of which is such that the lower edge of the opening will be situated below the floating line or the suction pump inlet members, at a depth equal to 0.01 meters.

This opening communicates with a funnel-shaped inner cavity of the floating pump inlet member, a smaller-dimensioned zone of which communicates with the outside through a hose which protrudes from the bottom of the floating pump inlet member.

Due to this arrangement, a mass of water entering the submerged part of the opening of the floating pump inlet member is passed through the hose, while the petroleum products drifting on the liquid surface are simultaneously absorbed.

The pump inlet members of the assembly are joined to each other by flexible couplings which permit, in spite of forming a type of barrier in a direction which could be perpendicular to that of travel of the tanker, each floating pump inlet member to independently adopt the buoyancy which corresponds thereto, depending on the surface of the sea. This ensures that the assembly of floating pump inlet members will always adapt to the form of the superficial profile of the water.

The end floating pump inlet members are joined to the cage through flexible couplings. This takes place so that fastening of the pump inlet members to the cage does not prevent the vertical displacement of the pump inlet members.

To prevent the pressure of the water during travel of the tanker from causing the assembly of suction pump inlet members to turn about the longitudinal axis thereof, which if it occurred would give rise to the positional change of the openings to an incorrect position, the pump inlet members are provided with horizontal guides situated at the lower and upper ends and at the front and rear zones thereof. These guides will be separated from the inner walls of the cages by approximately 0.01 meters, which permits complete freedom of vertical movement of the pump inlet members in the interior of the cages, while preventing the pump inlet members from turning about their longitudinal axes.

All the floating pump inlet members are provided with check valves to permit, when necessary, the hoses to be primed for a correct and perfect flow.

Obviously, when the tanks of the ship are being filled by a mixture of water and petroleum products from the pump inlet members, the draft of the ship will be increased and therefore the cages will be further submerged. This requires that the relative position of the pump inlet members with respect to the cages must be varied. This is achieved, since the pump inlet members, being floats, will rise in the interior of the cages.

In practice, the floating line of the pump inlet members will vary slightly. Since the suction hoses hang from the bottoms of the pump inlet members, the length of each hose will vary depending on the position of the respective pump inlet member in the interior of the cage. For this reason, when the pump inlet members are in the upper portions of the cages, they will support a greater weight of the hoses and, the floating lines will be raised with respect to the cages but lowered with respect to the water surface, and the inlet openings will be further submerged. Consequently, a greater amount of water than that necessary will enter, in which case the performance of the assembly will be reduced. Thus, if the amount of inlet water is to be maintained substantially constant, it is desirable to install a float cut-off valve for each opening of each pump inlet member. This ensures a constant inlet of water controlled by each pump inlet member, completely independent of the other pump inlet members.

The suction hoses of each of the floating pump inlet members descend to the lower part of the cages and are supported at the outer rear portions thereof to project upwardly to the ship where they will be connected to vacuum sources, e.g. suction pumps, if the tanker is provided therewith.

If the tanker is only provided with discharge pumps, to the loading line can be connected the hoses of the floats, by means of which a siphon action can be achieved once the hoses have been primed, whereby the lower tanks of the ship are filled and therefrom, by means of the discharge pumps, the remaining tanks are filled.

BRIEF DESCRIPTION OF THE DRAWINGS

For a better understanding of the invention, reference is made to the following detailed description and to the accompanying drawings, wherein.

DETAILED DESCRIPTION OF THE INVENTION

Figure 1:
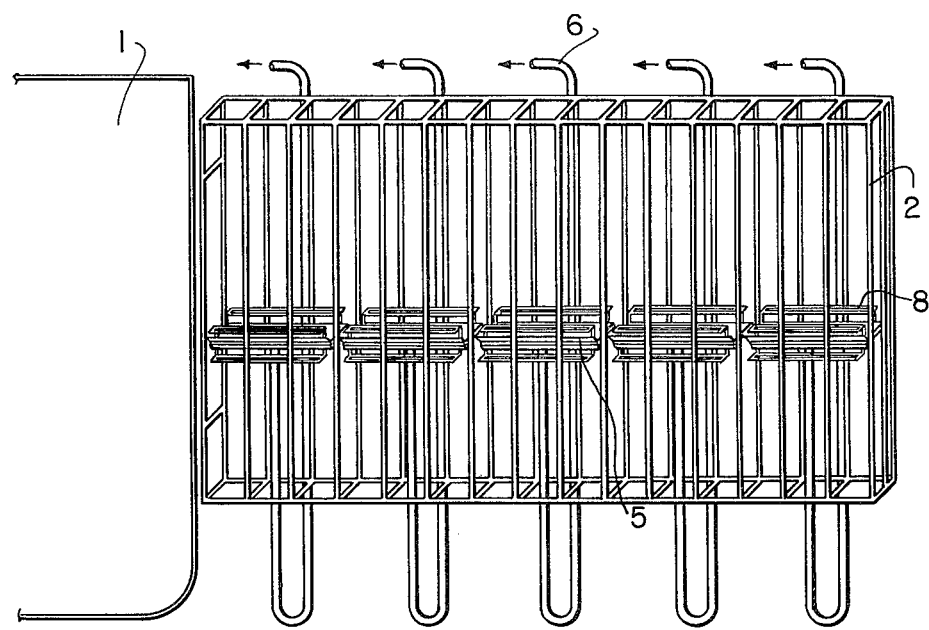
FIG. 1 is a side elevation illustrating an assembly or battery of floating suction pumps inlet members or housings positioned in a cage which is mounted at the beam-end of a tanker.

Referring to the drawings, and more specifically to FIGS. 1 to 5, the system of the invention involves arranging at the sides of a tanker 1 cages 2, preferably prismatic in shape, or in the form of rectangular hexahedrons or parallelepipeds, which are fixed to the tanker through pivot points 3 so that, by means of the fittings 4, such as cables, cages 2 can be oriented at suitable positions with respect to the longitudinal axis of the tanker.

In each one of the cages 2 is housed a series of floating suction pump inlet members or housings 5 correlatively joined by flexible couplings A. The suction pump inlet members 5 are joined by means of flexible couplings so that the pump inlet members may independently adopt the buoyancy corresponding thereto, depending on the surface of the sea. That is, the assembly of battery of suction pump inlet members 5 will adapt to the form of the superficial profile of the water.

The end suction pump inlet members, i.e. those situated at opposite ends of the battery which is formed by the correlative joining of the complete assembly, are likewise joined to the cages 2 by means of flexible couplings. These couplings are secured to the cages 2 in such a way that they will permit the vertical displacement of the suction pump inlet members within the cages.

Each suction pump inlet member 5 is connected to suction hoses 6, and the front part of each pump inlet member has a longitudinal opening 9 and a float cut-off valve 7 which controls the inlet of water through the opening 9.

Each suction pump inlet member 5 has fixed thereto guides 8 which prevent the suction pump inlet members from turning on the longitudinal axis thereof, i.e. guides 8 constitue a type of stablizer so that the opening 9 is always in a vertical plane, which is the correct position to receive the inlet of water.

Figure 8:
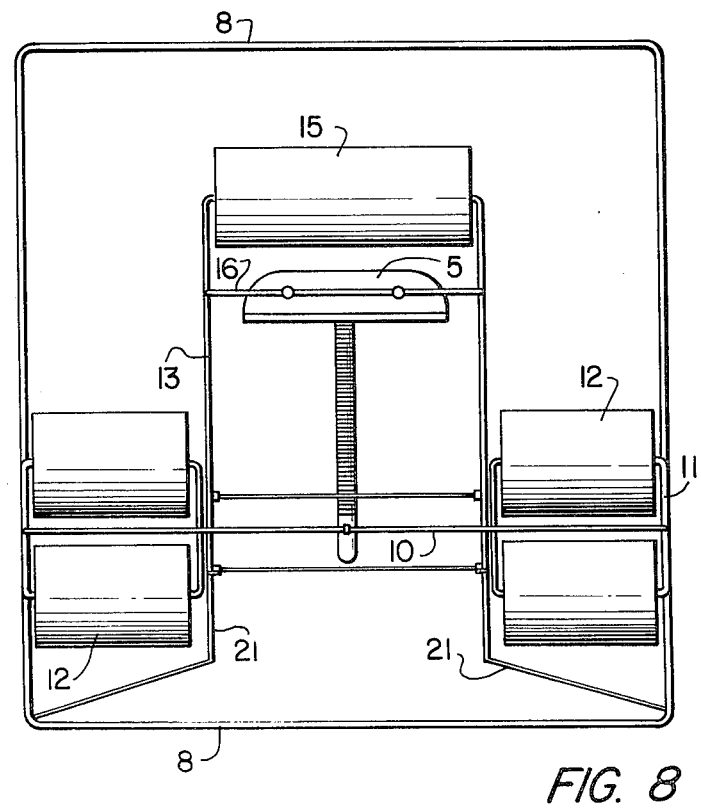
FIGS. 7 and 8 are a side elevational view and a plan view, respectively, of the embodiment of FIG. 6.
Figure 2:
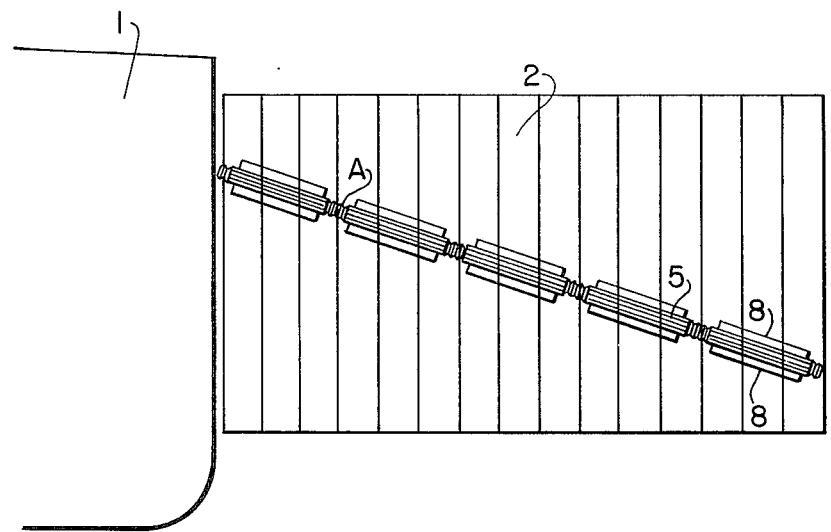
FIG. 2 is a view similar to FIG. 1 and illustrates how the floating suction pump inlet members adopt an inclined position with respect to the side of the tanker.
Figure 3:
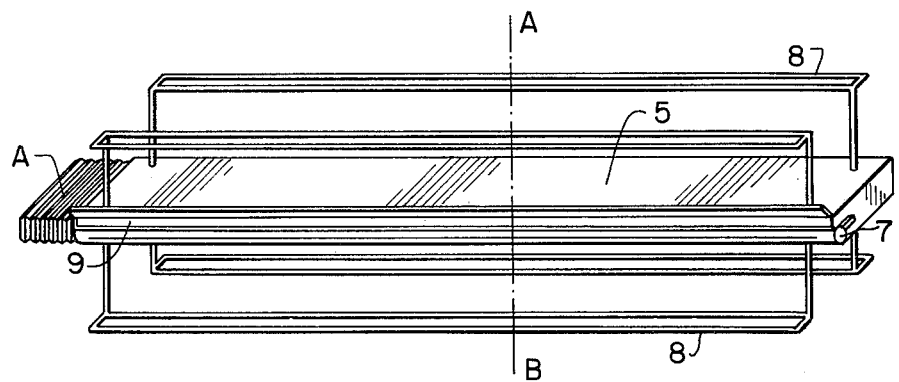
FIG. 3 is a perspective view of one of the floating suction pump inlet members.
Figure 4:
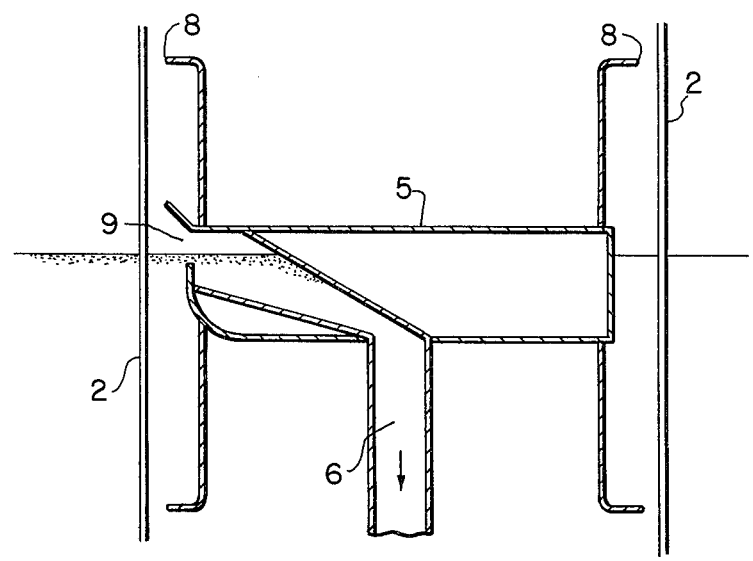
FIG. 4 is a cross-sectional view, taken along line A-B of FIG. 3, of the floating suction pump inlet member.
Figure 5:
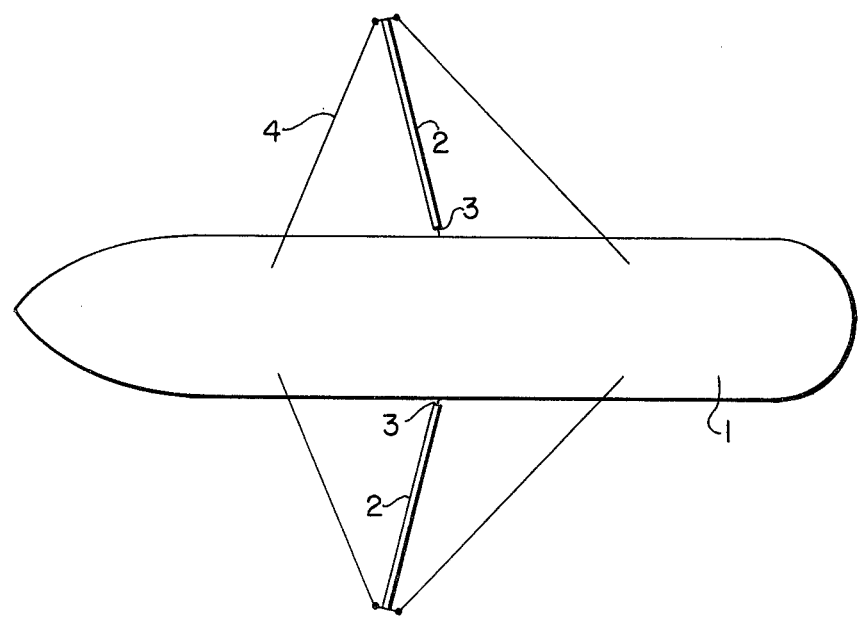
FIG. 5 is a schematic plan view of the profile of a tanker with fittings used to adjust the orientation of the cages.
Figure 6:
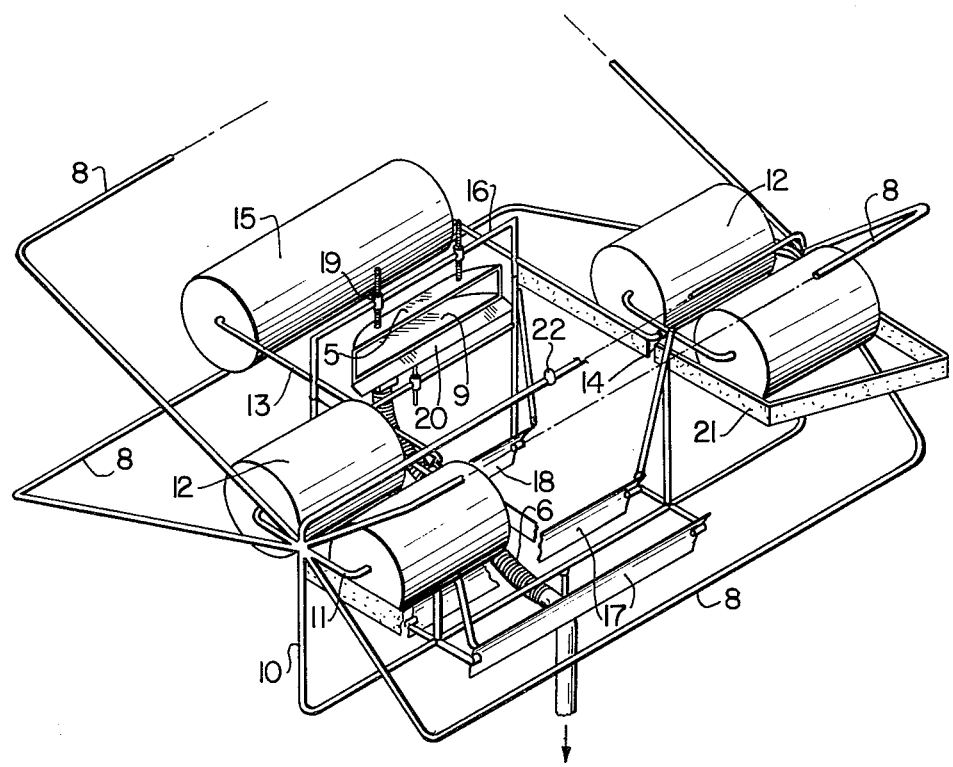
FIG. 6 is a perspective view of another embodiment of inlet members according to the invention.
Figure 7:
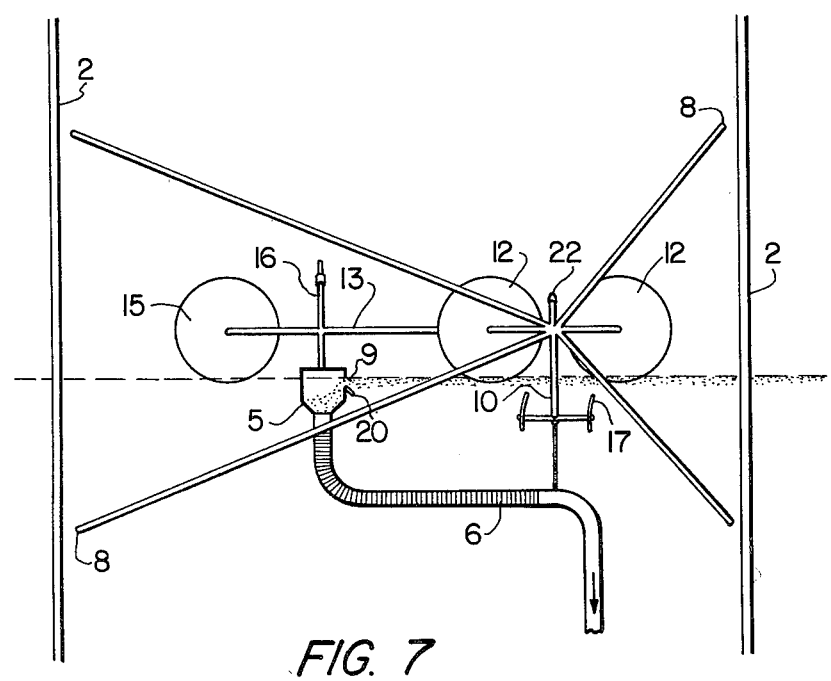

In the embodiment illustrated in FIGS. 6, 7 and 8, each suction pump inlet member or housing 5 is incorporated in a structure formed by means of the functional combination of two frames formed, for example, from cylindrical tubular bodies.

One of the frames 10 will be referred to as the main or front frame and, as illustrated in FIG. 6, is a type of rectangular frame situated in a vertical plane. The frame 10 is provided, at the top lateral ends thereof, with tubular end frames 11 which, in the assembly, adopt a horizontal position and constitute support elements for cylindrical or spherical floats 12. These geometrical shapes are indicated since they are the best to obtain a greater sensitivity to buoyancy.

In the assembly of this front or main frame, each float 12 is arranged at one or the other side of the vertical plane occupied by rectangular frame 10.

A rear frame, which will be referred to as the secondary frame, is comprised of a first generally U-shaped tubular member 13 which, at the free ends of its parallel legs, is pivotally joined at points 14 to the frames 11 which support the floats 12. This first member 13 of the rear frame occupies, within the structure, an exact horizontal plane and supports on its intermediate leg another float 15. A second tubular member 16 of the secondary frame forms a type of bridge which is securely joined to the parallel legs of the first member 13 and which constitutes a self-supporting structure for the floating suction pump inlet member 5.

Within the general structure of the assembly, it should be noted that both the rectangular frame 10, which forms the main or front frame, and the secondary frame have adjustable balancing flaps 17 and 18 in order to prevent, during travel of the tanker, such frames from submerging more than necessary due to an increase in the pressure of the water, i.e. the flaps proportion a constant buoyancy to the assembly.

An important detail is that the suction pump inlet member 5 is mounted on the bridge like member 6, such that the height of the pump inlet member can be adjusted. As a nonlimiting example, such adjustment can be achieved by studs on which nuts 19 are threaded. This is a very important detail, since such adjustment facilitates the arrangement of the opening 9 of the suction pump inlet member 5 and, in this case, an inclined flange 20 thereof at the exact distance with respect to the level of the liquid mass from which the petroleum products should be collected.

Flange 20, whose forward extension can be more or less prolonged, can optionally include an electric resistance so that, in case of very low temperatures, with the consequent increase in the viscosity of the petroleum substances, such resistance will heat the products to a temperature so that they may be liquefied as much as possible and in this way facilitate the entrance or introduction of the substances into the suction pump inlet member.

At both sides of the assembly and at the inner portions of the floats 12, there are arranged plates 21 forming guides for the products drifting towards the opening 9 of the suction pump inlet member 5.

This structure is provided, at the top thereof, with hooking means 22 which permit the suction pump inlet members to be raised from the water once the tanker has terminated the cleaning operation. By securing the cages 2 to the sides of the tanker, the tanker can navigate under relatively normal conditions to an unloading site.

The mixture of sea water and petroleum products introduced onto the tanker can be separated on the tanker by means of suitable devices, the thus separated products being stored on the tanker while the clean water is returned to the sea. Also, should the pertinent installations for a correct separation not be available on the tanker, the mixture can be unloaded to installations on land where the separation can take place.

To collect the contaminated waters from the sea, the tanker should move at suitable speed, depending on the absorption capacity of the assembly of pump inlet members, since the speed of the tanker should never be greater than the absorption capacity of the suction pump inlet members 5. If the speed of the tanker is greater than the pump capacity, the products would be gathered at the front faces of the suction pump inlet members and would pass toward the rear of the tanker. Therefore, cleaning would be rather relative and would lack effectiveness. It is also convenient for the cages 2 to be installed in pairs, i.e. to be fixed at both sides of the tanker.

As is logical, the number of suction pump inlet members and the exact measurements thereof will be determined by the conditions and absorption power of the tanker.

The system of the invention for collecting products by means of floating suction pump inlet members provides the advantages that the cost thereof is low, high production is obtained, and it is possible, without large economical investments, to install same in any tanker to be used for collecting petroleum products drifting on the sea.

I claim:

1. In a system for collecting products floating on the surface of a body of water, particularly for collecting petroleum products floating on the surface of the sea, said system being of the type including a ship and collecting devices extending from opposite sides of said ship for collecting products from the water surface and for transferring said products to said ship, the improvement wherein each said collecting device comprises:

a cage having a substantially rectangular parallelepided configuration and connected at one end thereof to the respective side of said ship by a freely articulated pivot so that said cage is pivotable in all directions about said pivot with respect to said ship, said cage having a height such that when said ship is at ballast the upper part of said cage will be above the maximum loading line of said ship and the lower part of said cage will be submerged;

a plurality of floating suction pump inlet housings positioned in a longitudinal arrangement within the interior of said cage, each said housing being retained in said cage for substantially independent vertical movement therein to adapt to the water surface and being prevented from movement in other directions relative to said cage;

each said housing having a substantially rectangular parallelepiped configuration including a front face oriented in the direction of travel of said ship;

said front face having therein, throughout substantially the entire width thereof, a longitudinal opening for allowing introduction of products on the water surface into the interior of said housing upon movement of said ship in said direction, said opening having a lower edge submerged beneath the floating line of said housing; and means, individually connected to each said housing, for connecting the interiors of said housings to a source of reduced pressure and for transferring products from said interior to said ship.

2. The improvement claimed in claim 1, wherein said interior of each said housing comprises a funnel-shaped cavity connected to said opening, and said connecting means comprises a flexible hose connected to a smaller dimension of said funnel-shaped cavity and extending from the bottom of said housing to said ship.

3. The improvement claimed in claim 1, wherein said lower edge of said opening is submerged by approximately 0.1 m.

4. The improvement claimed in claim 1, wherein adjacent said housings are connected by flexible couplings.

5. The improvement claimed in claim 4, wherein endmost of said housings are connected to said cage by flexible couplings.

6. The improvement claimed in claim 1, wherein each said housing has connected thereto horizontally extending guide means for preventing said housing from rotation about the horizontal longitudinal axis thereof with respect to said cage.

7. The improvement claimed in claim 1, wherein each said housing includes check valve means for controlling the inlet of products and water through said opening.

8. The improvement claimed in claim 1, further comprising frame means for retaining each said housing within said cage, said frame means comprising a main frame supporting floats, and a secondary frame connected to said main frame and supporting said housing.

9. The improvement claimed in claim 8, wherein said main frame comprises a rectangular frame member aligned in a vertical plane, and end frame members connected to upper end portions of said rectangular frame member and extending in horizontal planes, said floats being mounted on said end frame members on opposite sides of said vertical plane, and said secondary frame comprises a generally U-shaped first frame portion having parallel legs the free ends of which are pivotally connected to said end frame members such that said first frame portion extends generally horizontally therefrom in a direction opposite to the direction of travel of said ship, said first frame portion including an intermediate web portion joining said two parallel legs and supporting a further float, and a second frame portion connected to said parallel legs of said first frame portion and extending in a plane generally transverse thereto, said housing being supported by said second frame portion.

10. The improvement claimed in claim 9, further comprising balancing flap means mounted on said rectangular frame member of said main frame and on said second frame portion of said secondary frame for balancing the buoyancy of said frames during travel of said ship.

11. The improvement claimed in claim 9, further comprising means for adjusting the relative vertical position of said housing on said second frame portion.

12. A collecting device to be connected to the side of a ship to extend therefrom as part of a system for collecting products floating on the surface of a body of water, particularly for collecting petroleum products floating on the surface of the sea, said collecting device comprising:

a cage having a parallelepiped configuration and adapted to be connected at one end thereof to a side of a ship by a freely articulated pivot so that said cage may be pivoted thereabout in all directions with respect to the ship, said cage having a height such that when the ship is at ballast the upper part of said cage is adapted to be above the maximum loading line of the ship and the lower part of said cage is adapted to be submerged;

a plurality of floating suction pump inlet housings positioned in a longitudinal arrangement within the interior of said cage, each said housing being retained in said cage for substantially independent vertical movement therein to adapt to the water surface and being prevented from movement in other directions relative to said cage;

each said housing having a substantially rectangular parallelepiped configuration including a front face adapted to be oriented in the direction of the travel of the ship;

said front face having therein, throughout substantially the entire width thereof, a longitudinal opening for allowing introduction of products on the water surface into the interior of the housing upon movement of the ship, said opening having a lower edge adapted to be submerged beneath the floating line of said housing; and means, individually connected to each said housing, for connecting the interiors of said housings to a source of reduced pressure, thereby enabling products in said interior of said housings to be transferred to the ship.

13. A device as claimed in claim 12, wherein said interior of each said housing comprises a funnel-shaped cavity connected to said opening, and said connecting means comprises a flexible hose connected to a small dimension of said funnel-shaped cavity and extending from the bottom of said housing.

14. A device as claimed in claim 12, wherein said lower edge of said opening is adapted to be submerged by approximately 0.1 m.

15. A device as claimed in claim 12, wherein adjacent said housings are connected by flexible couplings.

16. A device as claimed in claim 15, wherein endmost of said housings are connected to said cage by flexible couplings.

17. A device as claimed in claim 12, wherein each said housing has connected thereto horizontally extending guide means for preventing said housing from rotation about the horizontal longitudinal axis thereof with respect to said cage.

18. A device as claimed in claim 12, wherein each said housing includes check valve means for controlling the inlet of products through said opening.

19. A device as claimed in claim 12, further comprising frame means for retaining each said housing within said cage, said frame means comprising a main frame supporting floats, and a secondary frame connected to said main frame and supporting said housing.

20. A device as claimed in claim 19, wherein said main frame comprises a rectangular frame member adapted to be aligned in a vertical plane, and end frame members connected to upper end portions of said rectangular frame member and adapted to extend in horizontal planes, said floats being mounted on said end frame members on opposite sides of said vertical plane, and said secondary frame comprises a generally U-shaped first frame portion having parallel legs the free ends of which are pivotally connected to said end frame members such that said first frame portion is adapted to extend generally horizontally therefrom in a direction opposite to the direction of travel of the ship, said first frame portion including an intermediate web portion joining said two parallel legs and supporting a further float, and a second frame portion connected to said parallel legs of said first frame portion and extending in a plane generally transverse thereto, said housing being supported by said second frame portion.

21. A device as claimed in claim 20, further comprising balancing flap means mounted on said rectangular frame member of said main frame and on said second frame portion of said secondary frame for balancing the buoyancy of said frames during travel of the ship.

22. A device as claimed in claim 20, further comprising means for adjusting the relative position of said housing on said second frame portion.

* * * * *